UNITED STATES PATENT OFFICE.

CHARLES W. HURD, OF GLENS FALLS, NEW YORK.

COMPOSITION OF MATTER TO BE USED AS A CALCIMINE.

SPECIFICATION forming part of Letters Patent No. 393,157, dated November 20, 1888.

Application filed January 25, 1888. Serial No. 261,898. (No specimens.)

*To all whom it may concern:*

Be it known that I, CHARLES W. HURD, of Glens Falls, in the county of Warren and State of New York, have invented a new and useful Composition of Matter to be used as a Calcimine, of which the following is a full, clear, and exact description.

The object of my invention is to improve the quality and lessen the expense of calcimine used as a wash or finish for interior walls of buildings.

The principal ingredient of my new composition is a substance known as "shell-marl," which if dirty is washed to remove impurities, and if too coarse is ground fine in any approved way. With the shell-marl so prepared I mix enough glue or other glutinous or starchy substance which is readily soluble in water to prevent the applied calcimine from easily rubbing off.

I may add a little whiting, commonly used for calcimines, to give a clearer white tint to the compound than the shell-marl has when prepared as above described. Coloring-matter of any shade may be used with the shell-marl and glutinous matter to give any desired tint to the calcimine.

A calcimine having shell-marl as its principal ingredient and devoid of oily and greasy substances spreads more freely than ordinary calcimines and dries more slowly, thus giving the workman ample time to coat the walls evenly and do first-class work, and the calcimine is cheaper than other compounds of the same general character.

What I claim, and desire to secure by Letters Patent of the United States, is—

1. The herein-described composition of matter for use as a calcimine, consisting of shell-marl and sufficient glutinous matter to prevent it from rubbing off when applied, substantially as herein set forth.

2. The herein-described composition of matter for use as a calcimine, consisting of shell-marl, sufficient glutinous matter to prevent it from rubbing off when applied, and a coloring-matter, substantially as herein set forth.

CHARLES W. HURD.

Witnesses:
H. L. CRANDELL,
FRED. T. RUSSELL.